(12) United States Patent
Ding et al.

(10) Patent No.: US 6,636,375 B1
(45) Date of Patent: Oct. 21, 2003

(54) SEEK IN A DISC DRIVE WITH NONLINEAR PIVOT FRICTION

(75) Inventors: MingZhong Ding, Singapore (SG); KianKeong Ooi, Singapore (SG); Louis Seng Hong Pang, Singapore (SG); Ricky Wei Watt Yeo, Singapore (SG); YangQuan Chen, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 516 days.

(21) Appl. No.: 09/584,261

(22) Filed: May 31, 2000

Related U.S. Application Data

(60) Provisional application No. 60/151,204, filed on Aug. 27, 1999.

(51) Int. Cl.⁷ .............................................. G11B 5/596
(52) U.S. Cl. ..................................................... 360/77.02
(58) Field of Search ............................... 360/77.02, 60, 360/73.03, 78.07, 78.09, 78.12

(56) References Cited

U.S. PATENT DOCUMENTS

| | | | |
|---|---|---|---|
| 5,214,550 A | | 5/1993 | Chan ........................ 360/97.01 |
| 5,623,758 A | | 4/1997 | Brooks, Jr. et al. ....... 29/603.01 |
| 5,668,680 A | * | 9/1997 | Tremaine .................. 360/78.07 |
| 5,831,790 A | | 11/1998 | Iftikar et al. .............. 360/99.12 |
| 5,831,795 A | | 11/1998 | Ma et al. ..................... 360/105 |
| 5,875,072 A | | 2/1999 | Brooks, Jr. et al. .......... 360/104 |
| 5,912,782 A | * | 6/1999 | Lee et al. .................. 360/78.09 |
| 6,285,521 B1 | * | 9/2001 | Hussein ..................... 360/73.03 |
| 6,414,809 B1 | * | 7/2002 | Sakai et al. ..................... 360/60 |
| 6,462,496 B1 | * | 10/2002 | Hassan et al. ............... 318/560 |
| 6,498,698 B1 | * | 12/2002 | Golowka et al. ......... 360/78.12 |

OTHER PUBLICATIONS

Abramovitch, D., et al., "Disk Drive Pivot Nonlinearity Modeling Part I: Frequency Domain", *Proceedings of the American Control Conference, Baltimore, Maryland*, vol. 3 of 3, 6 pages, (Jun. 1994).

Canudas de Wit, C., et al., "Dynamic Friction Models and Control Design", *Proceedings of the 1993 American Control Conference*, vol. 2 of 3, 9 pages, (Jun. 2–4, 1993).

Eddy, K., et al., "Bias in Disc Drive Rotary Actuators: Characterization, Prediction, and Compensation", *IEEE Transactions on Magnetics*, vol. 33 No. 3, 16 pages.

Wang, F., et al., "Disk Drive Pivot Nonlinearity Modeling Part II: Time Domain", *Proceedings of the American Control Conference, Baltimore, Maryland*, 5 pages, (Jun. 1994).

* cited by examiner

*Primary Examiner*—David Hudspeth
*Assistant Examiner*—Fred F. Tzeng
(74) *Attorney, Agent, or Firm*—Derek J. Berger; David K. Lucente

(57) ABSTRACT

According to one embodiment of the present invention, a disc drive includes a disc and a transducer supported by an actuator assembly that is accelerated by controlling current in a voice coil. The disc drive controls a position of the transducer over a present track on the disc in a track-and-follow mode, generates an estimated bias current to be applied to the voice coil to balance a bias on the actuator assembly when the transducer is over the present track, starts a movement of the transducer toward a target track in a seek mode, enters the estimated bias current into a bias table if an immediately preceding movement of the transducer in the seek mode was longer than a seek length boundary such that nonlinear friction in a pivot in the actuator assembly is less substantial, and applies a bias current to the voice coil calculated based on a bias current entry in the bias table during the seek mode.

16 Claims, 11 Drawing Sheets

SEEK IN A DISC DRIVE WITH NONLINEAR PIVOT FRICTION

RELATED APPLICATION

This application claims the benefit of U.S. Provisional Application Ser. No. 60/151,204, filed Aug. 27, 1999 under 35 USC 119(e).

FIELD OF THE INVENTION

The present invention relates to the field of disc drive data storage devices. More particularly, this invention relates to a method and an apparatus for managing a seek mode in a disc drive with nonlinear pivot friction.

BACKGROUND OF THE INVENTION important device in any computer system is a data storage device. Computer systems have many different places where data can be stored. One place for storing massive amounts of data and instructions is a disc drive. The disc drive has one or more discs, each with two surfaces on which data is stored. The surfaces are coated with a magnetizable medium that is magnetized in alternate directions to store the data and instructions. The surfaces are computer-readable mediums holding computer-readable data and computer-readable and computer-executable instructions. The discs are mounted on a hub of a spindle motor for rotation at an approximately constant high speed during the operation of the disc drive. An actuator assembly in the disc drive moves transducers to various locations relative to the discs while the discs are rotating, and electrical circuitry is used to write data to and read data from the discs through the transducers. Data and instructions are stored on one or both of the surfaces of each disc. The disc drive also includes circuitry for encoding data and instructions written to the discs and for decoding data and instructions read from the discs. A microprocessor controls most operations of the disc drive, such as transmitting information including instructions or data read from the discs back to a requesting computer and receiving data or information from the requesting computer for writing to the discs.

Each transducer is typically located on a small ceramic block, also referred to as a slider, that is aerodynamically shaped so that it flies over a surface of one of the discs. When the disc rotates, air flow is induced between the slider and the disc, causing air pressure which forces the slider away from the disc. The slider is also attached to a load spring that produces a force on the slider directed toward the disc. The forces on the slider equilibrate such that the slider flies over the surface of the disc at a desired fly height.

Information representative of data or instructions is stored in tracks on the surfaces of the discs. In some disc drives, information is stored in a multiplicity of concentric circular tracks on the surface of each disc. In other disc drives, information is stored in a single track that forms a continuous spiral on each side of the discs. A transducer carried by a slider is positioned over a track on a surface of one of the discs to write information to or read information from the track. Once the operation is complete, the transducer may be controlled to move to a new, target track, to write information to or read information from the target track. The movement takes place in the following modes. The transducer is moved radially across the surface of the disc in a seek mode to position it near the target track. The transducer is then positioned over the target track during a track-and-follow mode, also called a tracking mode, to read or write the information stored in the target track. Servo information is read from the target track by the transducer, and a feedback control system determines a position error signal from the servo information. If the transducer is not in a correct position, it is moved to a desired position over the target track in response to the position error signal.

Each slider is supported by the actuator assembly which is controlled to position the transducer in the slider over the surface of one of the discs. Each slider is attached to a load spring supported by an arm. The arms in the actuator assembly are rotatably mounted to an actuator shaft through bearings and are rotated about the actuator shaft by a voice coil motor to move the transducers over the surfaces of the discs. The bearings and the actuator shaft are also called a pivot. The voice coil motor includes a voice coil mounted to the actuator assembly opposite to the arms. The voice coil is immersed in a magnetic field of an array of permanent magnets placed adjacent to the actuator assembly. The feedback control system applies current to the voice coil in a first direction to generate an electromagnetic field that interacts with the magnetic field of the magnets. The interaction of the magnetic fields applies a torque to the voice coil to rotate the actuator assembly about the pivot, and the actuator assembly is accelerated to move the transducer to a new position. The feedback control system may then apply current to the voice coil in a direction opposite to the first direction to apply an opposite torque on the actuator assembly. The opposite torque may be used to decelerate the actuator assembly and position the transducer over a target track. The opposite torque may also be used to accelerate the actuator assembly to a different position.

The actuator assembly is subject to different amounts of torque, also called bias, at different positions relative to the discs. The bias is a result of several factors, including spring action operating on the actuator assembly due to a flexible cable connecting electrical circuitry in the actuator assembly to other electrical circuits in the disc drive, gravity, windage acting on the arms, friction in the pivot, the direction of a preceding rotation of the actuator assembly, and other factors. The bias is nonlinear, in part because the friction in the pivot is nonlinear. The current applied to the voice coil to maintain the position of one of the sliders in a tracking operation is augmented to overcome the bias.

During both the seek and track-and-follow modes it has become common to balance the bias described above with a bias current applied to the voice coil to induce a torque on the actuator assembly that is opposed to the bias. The bias current is selected from a bias table that has bias current entries for each position of the actuator assembly. The bias current entries are partitioned in the bias table according to tracks or zones of adjacent tracks on the discs over which the sliders may be positioned.

Disc drives are being produced with increasing track densities and decreasing access times. Feedback control systems in modem disc drives must move the sliders to the correct position in a very short period of time. Incorrect bias current entries in the bias table can cause seek errors for a feedback control system. A seek error occurs when the feedback control system does not move the slider close enough to the target track in the seek mode to begin tracking. The seek mode must be repeated in the event of a seek error. A seek error rate refers to the number of seek errors that occur during a period of operation of the disc drive. A disc drive that exhibits a high seek error rate performs poorly because its average access time is increased. At an extreme, a disc drive may be inoperable because of a high seek error rate.

The bias current entries in the bias table are updated with output from a bias estimator, which is generated from the position error signals. However, the nonlinearities in the bias described above, including the nonlinearity of the friction in the bearings, leads to incorrect updates of the bias current entries and an increase in the seek error rate. There remains a need for a disc drive that updates bias current entries in a bias table more accurately to minimize seek errors. Such a disc drive should update the bias current entries more accurately in view of the nonlinear bias that an actuator assembly is subject to, such as nonlinear pivot friction. Such a disc drive would have improved performance because of a reduced seek error rate.

SUMMARY OF THE INVENTION

According to one embodiment of the present invention, a disc drive system includes a disc and a transducer supported by an actuator assembly that is accelerated by controlling current in a voice coil in the actuator assembly. The disc drive system also includes a control circuit operatively configured to control a position of the transducer over a present track on the disc in a track-and-follow mode, to generate an estimated bias current to be applied to the voice coil to balance a bias on the actuator assembly when the transducer is over the present track, to start a movement of the transducer toward a target track in a seek mode, to enter the estimated bias current into a bias table if an immediately preceding movement of the transducer in the seek mode was longer than a seek length boundary, and to apply a bias current to the voice coil calculated based on a bias current entry in the bias table during the seek mode. The seek length boundary is generated to indicate seek lengths shorter than the seek length boundary for which nonlinear friction in a pivot in the actuator assembly is more substantial and seek lengths equal to or longer than the seek length boundary for which nonlinear friction in the pivot is less substantial.

Advantageously, in the disc drive system according to the above-described embodiment of the present invention, the bias table is updated with the estimated bias current only if an immediately preceding movement of the transducer in the seek mode was longer than a seek length boundary. The bias table is not changed following movements of the transducer that are shorter than the seek length boundary, for which nonlinear friction in the pivot is more substantial. The bias current entries in the bias table are updated more accurately in view of nonlinear pivot friction to minimize seek errors. The disc drive system therefore has a reduced seek error rate.

DESCRIPTION OF THE PREFERRED EMBODIMENT

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

Figure 1:
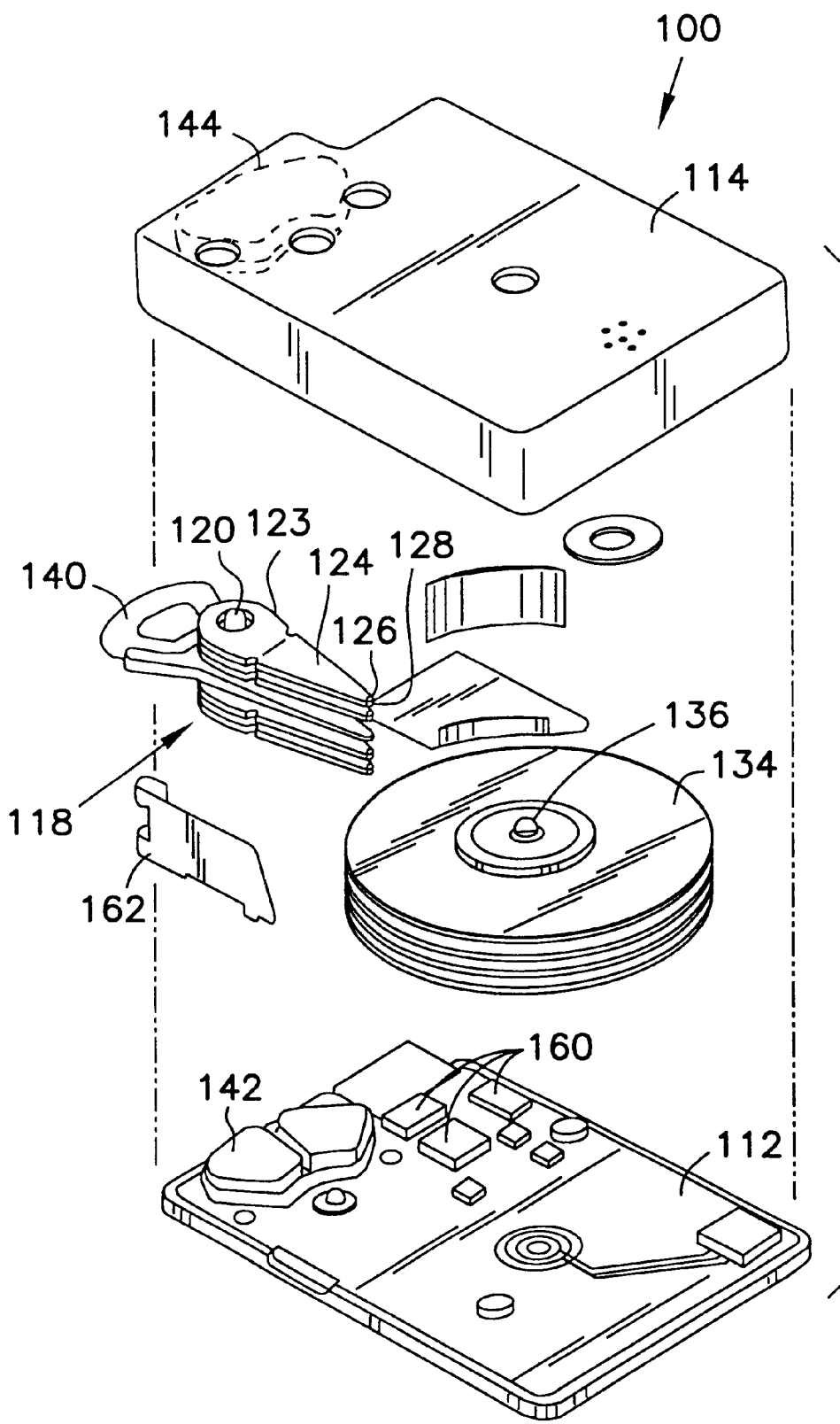
FIG. 1 is an exploded view of a disc drive according to an embodiment of the present invention.

The embodiments of the present invention described in this application are useful with all types of disc drives, including hard disc drives, zip drives, and floppy disc drives. An exploded view of a disc drive 100 is shown in FIG. 1 according to an embodiment of the present invention. The disc drive 100 includes a housing or base 112 and a cover 114. The base 112 and cover 114 form a disc enclosure. An actuator assembly 118 is rotatably mounted to an actuator shaft 120, and the actuator shaft 120 is mounted to the base 112. The actuator assembly 118 includes a comb-like structure of a plurality of arms 123. A load spring 124 is attached to each arm 123. The load springs 124 are also referred to as suspensions, flexures, or load beams. A slider 126 is attached to an end of each load spring 124, and each slider 126 carries a magnetic transducer 128. Each slider 126 is a small ceramic block which is passed over one of several discs 134.

The discs 134 each have two surfaces, and information is stored on one or both of the surfaces. The surfaces are coated with a magnetizable medium that is magnetized in alternate directions to store the information. The surfaces are computer-readable mediums holding the information including computer-readable data and computer-readable and computer-executable instructions. The information is arranged in tracks on the surfaces of the discs 134. The discs 134 are mounted on a hub 136 of a spindle motor (not shown) for rotation at an approximately constant high speed. Each slider 126 is moved over a surface of one of the discs 134 by the actuator assembly 118 as the discs 134 rotate so that the transducer 128 may read information from or write information to the surface of the disc 134. The embodiments of the present invention described herein are equally applicable to disc drives which have a plurality of discs or a single disc attached to a spindle motor, and to disc drives with spindle motors which are either under a hub or within the hub. The embodiments of the present invention are equally applicable to disc drives in which information is stored in a multiplicity of concentric circular tracks on the surface of each disc, or in disc drives in which information is stored in a single track arranged as a continuous spiral on each side of the discs.

Each slider 126 is held over a surface of one of the discs 134 by opposing forces from the load spring 124 forcing the slider 126 toward the surface and air pressure caused by the rotation of the discs 134 forcing the slider 126 away from the surface. The slider 126 and the transducer 128 together comprise what is called a read/write head. It should also be noted that the embodiments of the present invention described herein are equally applicable to sliders 126 having more than one transducer 128. For example, magnetoresistive heads, also called MR heads, have one transducer used for reading data from a disc and a second transducer for writing data to the disc. MR heads may have an additional transducers used for other purposes such as erasing the disc.

A voice coil 140 is mounted to the actuator assembly 118 opposite the load springs 124 and the sliders 126. The voice coil 140 is immersed in a magnetic field of a first permanent magnet 142 attached within the base 112, and a second permanent magnet 144 attached to the cover 114. The permanent magnets 142, 144, and the voice coil 140 are components of a voice coil motor which is controlled to apply a torque to the actuator assembly 118 to rotate it about the actuator shaft 120. Current is applied to the voice coil 140 in a first direction to generate an electromagnetic field that interacts with the magnetic field of the permanent magnets 142, 144. The interaction of the magnetic fields applies a torque to the voice coil 140 to rotate the actuator assembly 118 about the actuator shaft 120, and the actuator assembly 118 is accelerated to move the transducer 128 to a new position. A current applied to the voice coil 140 in a direction opposite to the first direction results in an opposite torque on the actuator assembly 118. The opposite torque may be used to decelerate the actuator assembly 118 and position the transducer 128 over a target track on one of the discs 134. The opposite torque may also be used to accelerate the actuator assembly 118 to a different position.

The disc drive 100 includes one or more integrated circuits 160 coupled to the actuator assembly 118 through a flexible cable 162. The integrated circuits 160 may be coupled to control current in the voice coil 140 and resulting movements of the actuator assembly 118. The integrated circuits 160 may also be coupled to the transducer 128 in the slider 126 for providing a signal to the transducer 128 when information is being written to the discs 134 and for receiving and processing a signal from the transducer 128 when information is being read from the discs 134. A feedback control system in the integrated circuits 160 may receive servo information read from the discs 134 through the transducers 128. The feedback control system determines a position error signal from the servo information. If the transducers 128 are not in a correct position, they are moved to a desired position over a target track in response to the position error signal. The circuits 160 may include a microprocessor, a digital signal processor, or one or more state machines to control operations of the disc drive 100. The integrated circuits 160 may also include memory devices such as EEPROM and DRAM devices and modulation and amplification circuits.

Figure 2:
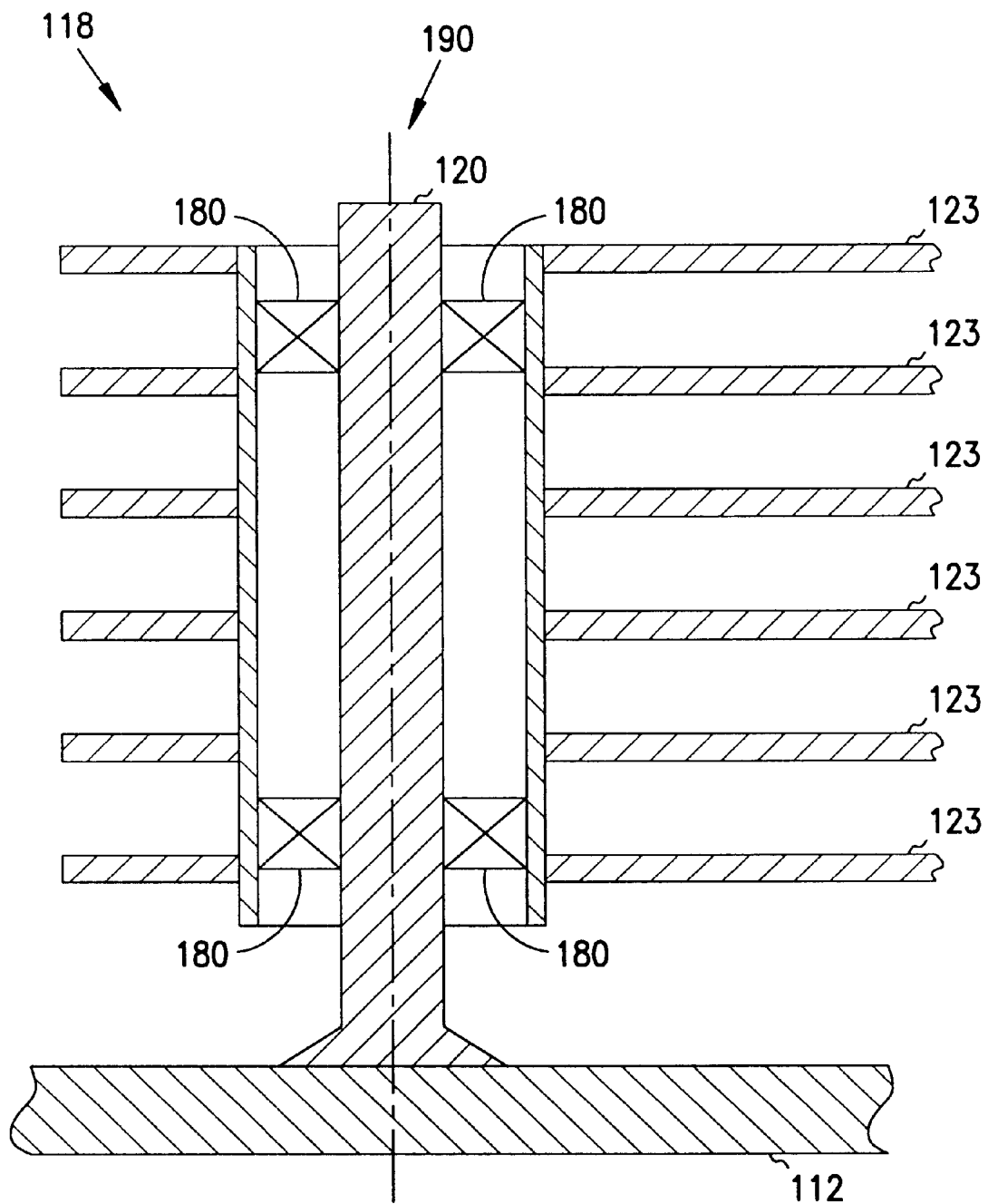
FIG. 2 is a cross-sectional view of an actuator assembly according to an embodiment of the present invention.

A cross-sectional view of the actuator assembly 118 is shown in FIG. 2 according to an embodiment of the present invention. The arms 123 are rotatably mounted to the actuator shaft 120 through several bearings 180, and the actuator shaft 120 is mounted to the base 112. The actuator shaft 120 and the bearings 180 comprise a pivot 190 of the actuator assembly 118.

Figure 3:
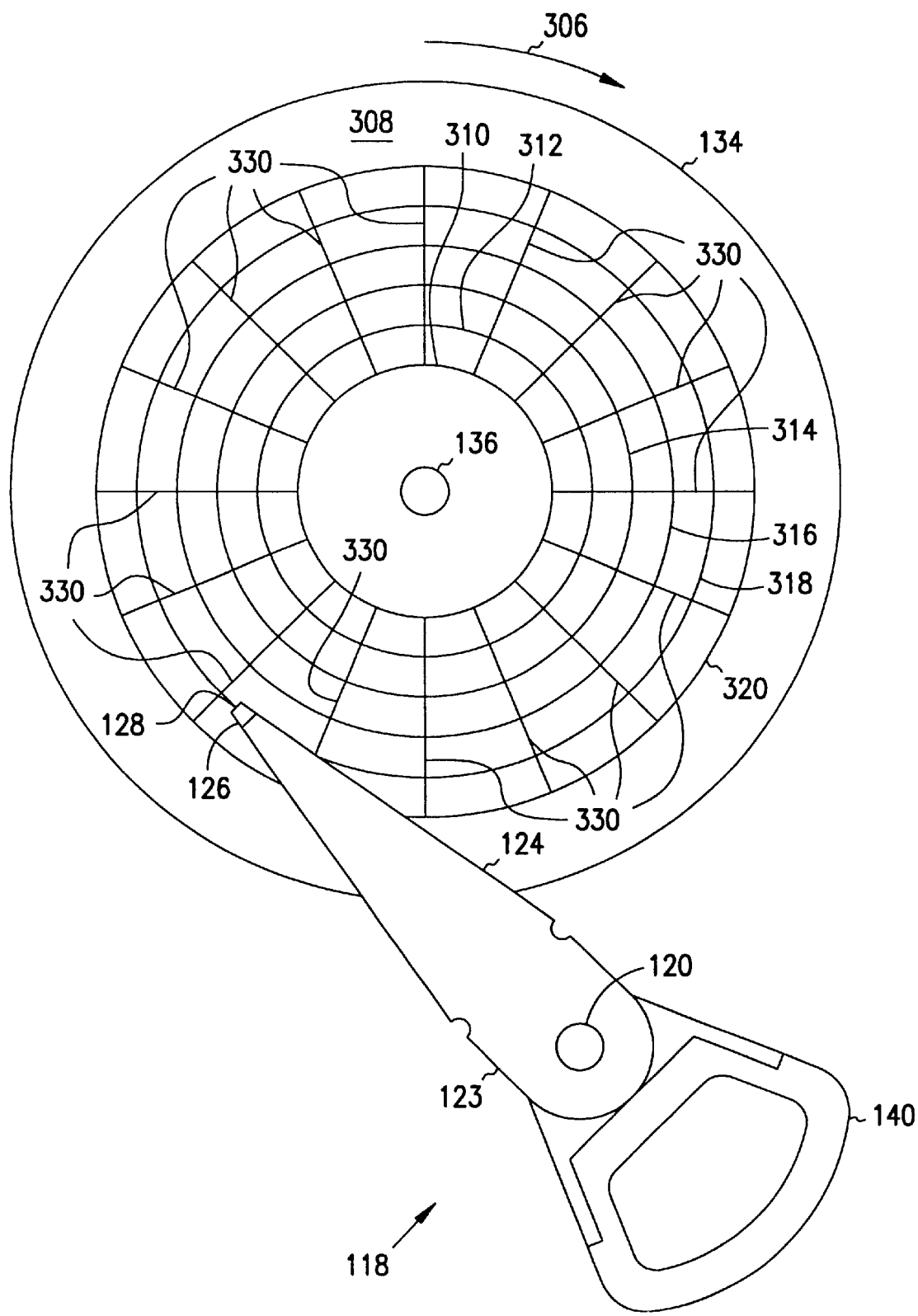
FIG. 3 is a top view of a disc and an actuator assembly according to an embodiment of the present invention.

A top view of one of the discs 134 and the actuator assembly 118 of FIG. 1 is shown in FIG. 3 according to an embodiment of the present invention. The disc 134 rotates in a direction 306 and has a top surface 308 that is coated with a magnetizable medium. Thousands of concentric circular tracks are arranged on the surface 308, and information is stored in each track. Six of the tracks, including an inner track 310, four intermediate tracks 312, 314, 316, and 318, and an outer track 320, are shown spaced apart on the surface 308 of the disc 134 in FIG. 3. The transducer 128 may be moved from the outer track 320 to the inner track 310 with a rotation of the actuator assembly 118 about the actuator shaft 120 by providing current to the voice coil 140 in a first direction. The transducer 128 may be moved from the inner track 310 to the outer track 320 with a rotation of the actuator assembly 118 by providing current to the voice coil 140 in a second direction opposite to the first direction.

The tracks are divided into sectors. The tracks are also divided by a number of servo wedges 330, sixteen of which are shown spaced apart on the surface 308 of the disc 134. The servo wedges 330 are narrow radial wedges embedded on the surface 308 for storing servo information including track numbers, sector numbers, and tracking information to be read by the transducer 128. The servo wedges 330 may or may not occur at boundaries between the sectors. The track numbers and sector numbers identify the track and sector over which the transducer 128 is positioned, and the tracking information is used by a feedback control system in the integrated circuits 160 to control the position of the transducer 128.

Figure 4:
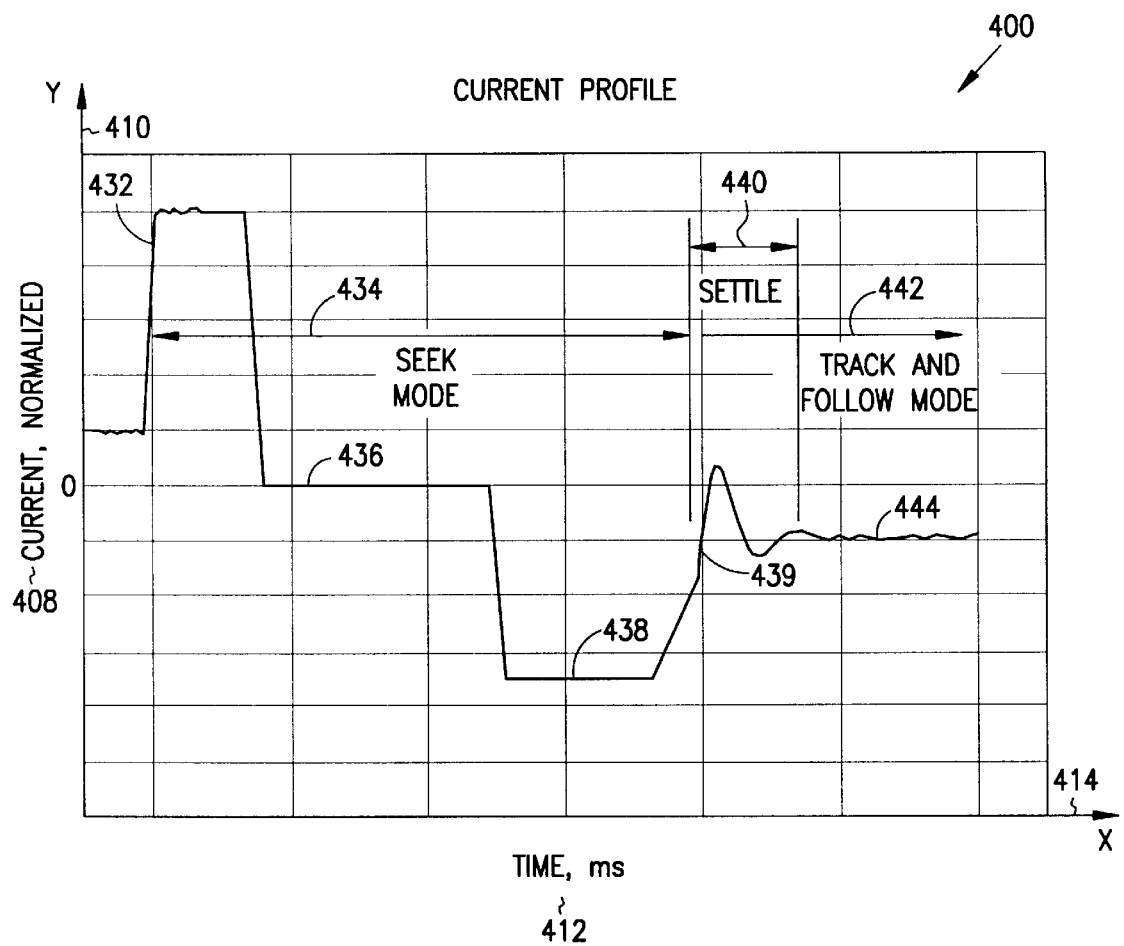
FIG. 4 is a current profile for current applied to a voice coil in a disc drive according to an embodiment of the present invention.

A current profile 400 for current applied to the voice coil 140 of the disc drive 100 of FIG. 1 is shown in FIG. 4 according to an embodiment of the present invention. The current profile 400 illustrates a typical control scheme to move one of the transducers 128 between selected tracks on one of the discs 134, with a normalized current 408 shown on a Y-axis 410, and time 412, in milliseconds, shown on an X-axis 414. Upon receiving a signal indicating that the transducer 128 is to be moved to a target track, a current 432 is applied to the voice coil 140 to accelerate the actuator assembly 118 in a seek mode 434. The current 432 has a polarity that indicates the direction of current in the voice coil 140 and determines the direction of rotation of the actuator assembly 118. The current 432 in FIG. 4 has a positive polarity that accelerates the actuator assembly 118 in a first direction. A current in the voice coil 140 with a negative polarity would accelerate the actuator assembly 118 in a second direction opposite to the first direction.

The actuator assembly 118 begins accelerating toward the target track in response to the current 432. When the actuator assembly 118 has accelerated to a predetermined velocity, the current in the voice coil 140 is reduced to approximately zero, as indicated at 436, to maintain the predetermined velocity as the transducer 128 moves toward the target track. A bias current (not shown) may also be supplied to the voice coil 140 during the seek mode 434 to balance a bias on the actuator assembly 118 as will be described hereinbelow. After that, a current 438 is applied to the voice coil 140 to decelerate the actuator assembly 118 until the transducer 128 is positioned very nearly over the target track. The current 438 has a negative polarity that is opposite to the positive polarity of the current 432, and therefore accelerates the actuator assembly 118 in the second direction.

Once the transducer 128 is positioned nearly over the target track, the current in the voice coil 140 is returned toward zero as shown at 439, and the control of the motion of the actuator assembly 118 passes from the seek mode 434 through a settle period 440 to a track-and-follow mode 442. The current in the voice coil 140 is allowed to oscillate and settle around a tracking current 444 in the settle period 440.

The tracking current 444 is used in the track-and-follow mode 442 to maintain a position of the transducer 128 over the target track such that it may read information from or write information to the target track. The tracking current 444 is controlled by the feedback control system in response to the servo information in the servo wedges 330 to maintain the position of the transducer 128.

The actuator assembly 118 is subject to bias caused by a spring action in the flexible cable 162 coupling electrical circuitry in the actuator assembly 118 to the integrated circuits 160. The bias is also caused by gravity, windage acting on the arms 123, friction in the pivot 190, the direction of a preceding rotation of the actuator assembly 118, and other factors. The bias changes with the position of the actuator assembly 118. A bias current is applied to the voice coil 140 to apply a torque to the actuator assembly 118 to balance the bias. The bias current is selected from a bias table that has bias current entries for each position of the actuator assembly 118. The bias current entries are partitioned in the bias table according to tracks or zones of adjacent tracks on the disc 134 over which the transducer 128 may be positioned. The bias table is stored in a computer-readable medium, and the bias current entries are updated as will be described hereinbelow.

Figure 5:
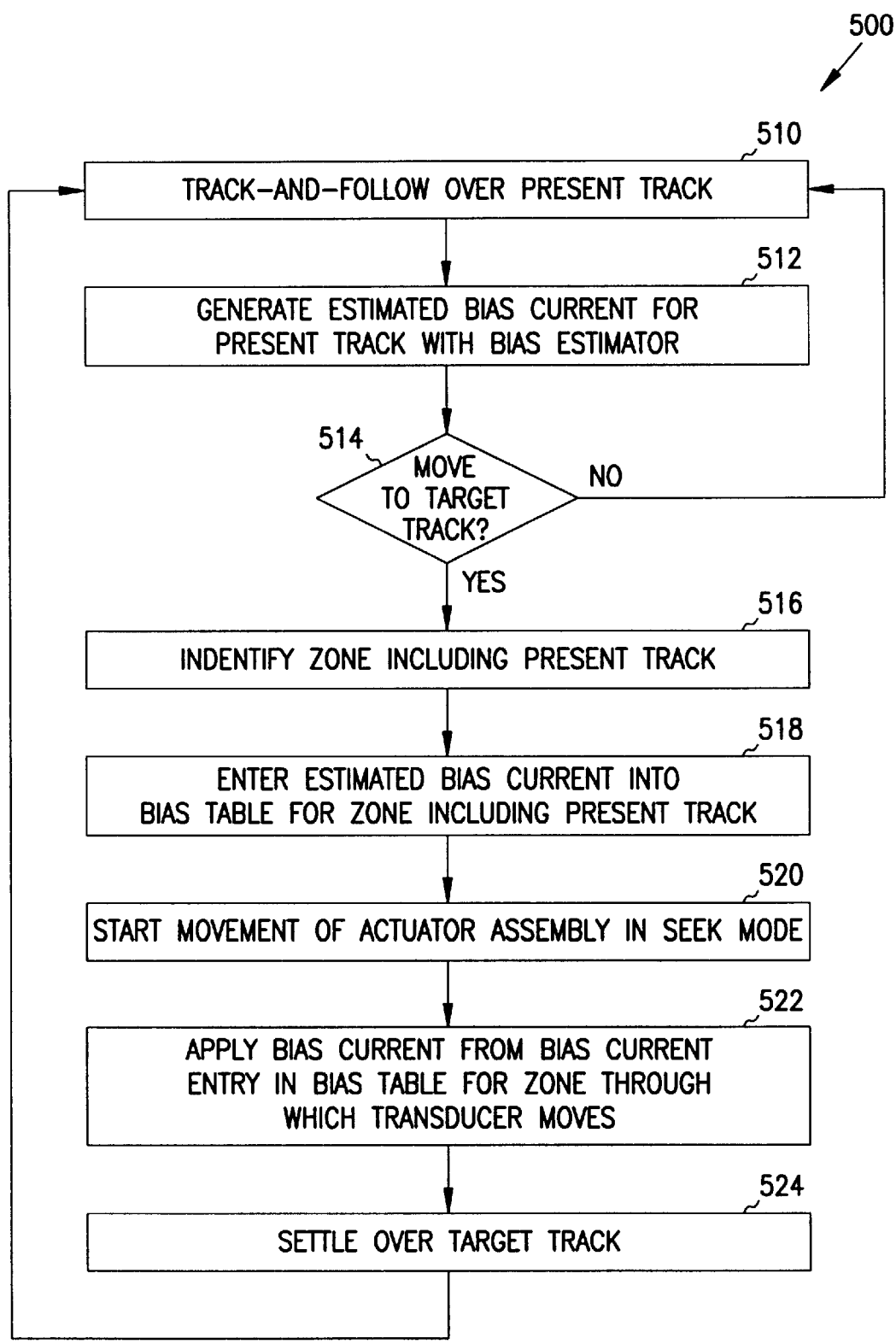
FIG. 5 is a flowchart of a method for controlling an actuator assembly according to the prior art.

A flowchart of a conventional method 500 for controlling an actuator assembly is shown in FIG. 5 according to the prior art. In 510 a transducer carried by the actuator assembly is positioned over a track on a disc, called a present track, in a track-and-follow mode. An estimated bias current is generated for the present track with a bias estimator in 512. The estimated bias current will induce a torque that is sufficient to balance a bias on the actuator assembly as the transducer is positioned over the present track. In 514 the method 500 determines if a request has been made to move the transducer from the present track to a target track, and if not returns to the track-and-follow mode in 510 and generates another estimated bias current in 512. Once a request is made to move the transducer to a target track the method 500 identifies a zone in the bias table including the present track in 516 and then enters the most recently generated estimated bias current as the bias current entry for the zone in the bias table in 518. The method 500 then starts a movement of the actuator assembly in a seek mode in 520. During the seek mode a bias current is applied to a voice coil in the actuator assembly in 522. The bias current is selected from the bias current entry in the bias table for the zone through which the transducer moves. In 524 the transducer settles over the target track which becomes the present track in the track-and-follow mode in 510.

Figure 6:
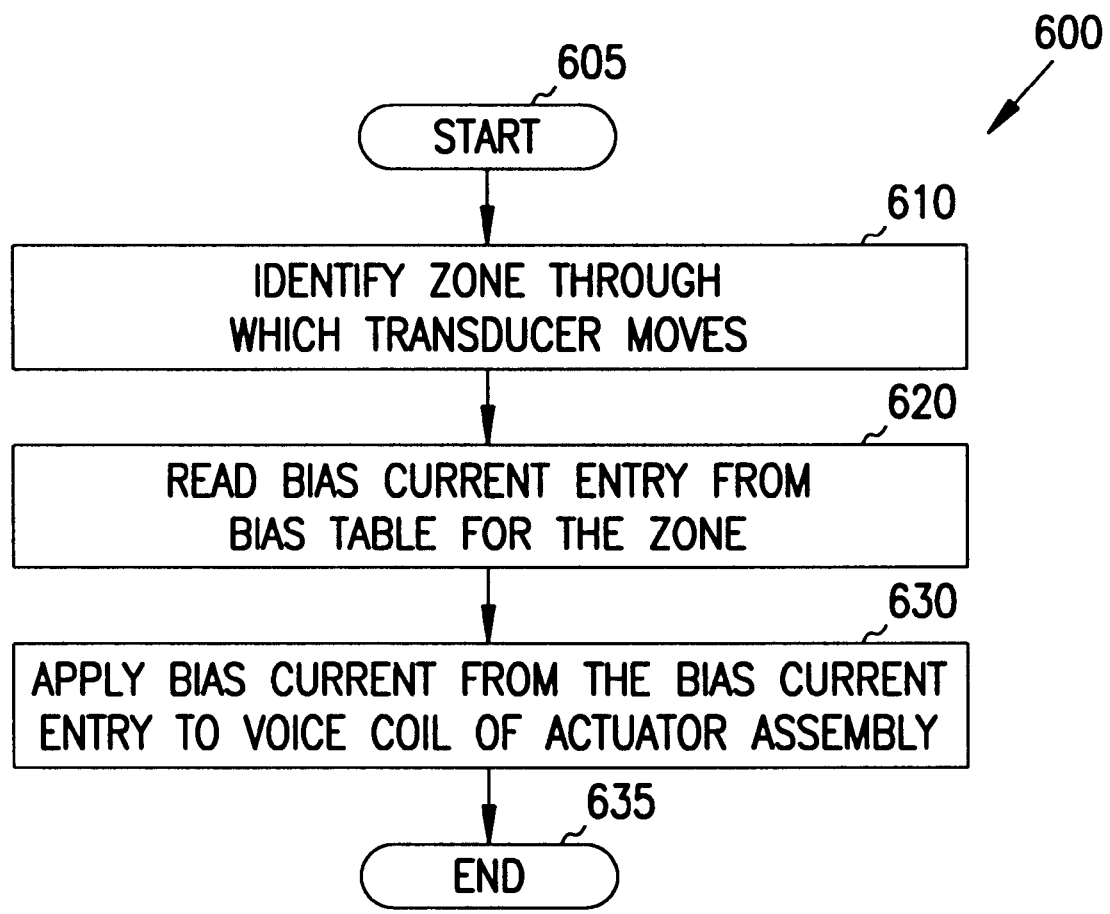
FIG. 6 is a flowchart of a method for applying bias current in the method of FIG. 5 according to the prior art.

A flowchart of a conventional method 600 for applying the bias current in 522 is shown in FIG. 6 according to the prior art. The method 600 begins in 605, and the zone through which the transducer moves is identified in 610. The bias current entry for the zone is read from the bias table in 620. In 630 the bias current from the bias current entry is applied to the voice coil to balance the bias on the actuator assembly as the transducer moves through the zone. The method 600 ends in 635. The method 600 is repeated until the transducer settles over the target track in 524.

The bias on the actuator assembly 118 of the disc drive 100 is subject to several nonlinear effects. For example, the pivot 190 exhibits nonlinear friction characteristics depending on the velocity of an immediately preceding rotation. If the actuator assembly 118 undergoes a short rotation at a low velocity the bearings 180 rotate very little and friction in the bearings 180 is substantial. The friction in the bearings 180 rises, or accumulates, during a rotation at low speed. The friction in the bearings 180 will continue to rise after repeated short rotations at low velocities. As a result, an elevated bias current must be applied to the voice coil 140 to apply a sufficient torque on the actuator assembly 118 to counter the rising friction in the bearings 180. When one of the transducers 128 is moved over a long distance to a target track, the actuator assembly 118 will achieve a high velocity during the seek mode 434. Friction in the bearings 180 is reduced during the rotation at high speed. As a result, a moderate bias current may be applied to the voice coil 140 to balance the bias during a long seek.

In the conventional method 500 shown in FIG. 5, the bias table is updated immediately preceding each move from the present track to a target track. As a consequence, the bias estimator produces high estimated bias currents after one or more short rotations of the actuator assembly. The high estimated bias currents can corrupt the bias table, and lead to seek errors when the transducer is being moved over a long distance to a target track and pivot friction is reduced. The closer the bias current entries in the bias table are to the current needed to balance the actual bias on the actuator assembly during the seek mode, the less error there will be in controlling the movement of the slider. Accurate bias current entries in the bias table are essential to reducing the seek error rate.

Figure 7:
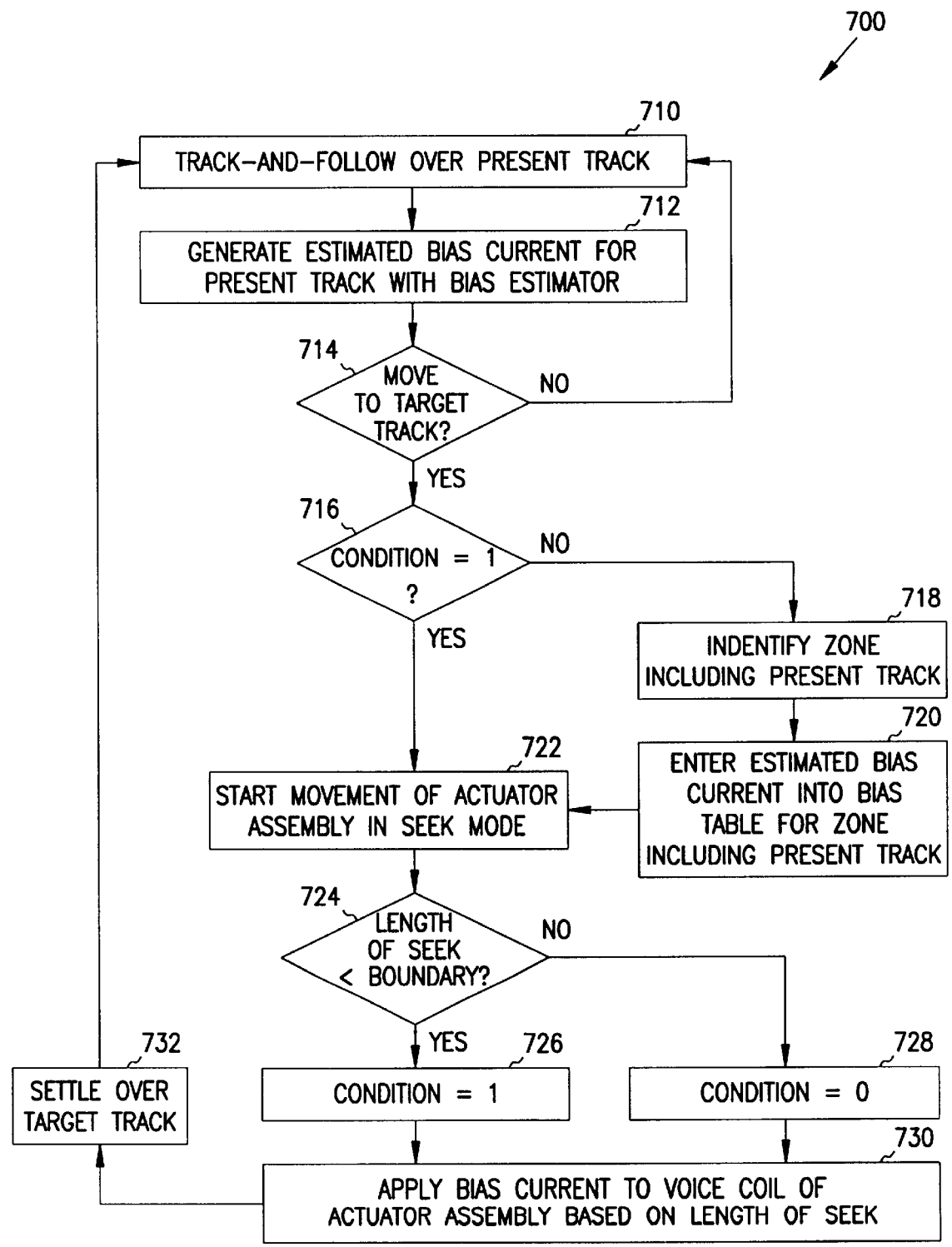
FIG. 7 is a flowchart of a method for controlling an actuator assembly according to an embodiment of the present invention.

A flowchart of a method 700 for controlling the actuator assembly 118 in the disc drive 100 with a bias table is shown in FIG. 7 according to an embodiment of the present invention. In 710 one of the transducers 128 is positioned over a track on one of the discs 134, called a present track, in a track-and-follow mode. An estimated bias current is generated for the present track with a bias estimator in 712 during the track-and-follow mode. The bias estimator is described below with reference to FIG. 9. The estimated bias current will induce a torque that is sufficient to balance a bias on the actuator assembly 118 as the transducer 128 is positioned over the present track. In 714 the method 700 determines if a request has been made to move the transducer 128 from the present track to a target track, and if not returns to the track-and-follow mode in 710 and generates another estimated bias current in 712. Once a request is made to move the transducer 128 to a target track the method 700 checks a condition in 716 that indicates the length of an immediately preceding seek. If the condition is low, or 0, indicating that the preceding seek was sufficiently long, the method 700 identifies the zone of the disc 134 including the present track in 718 and then enters the most recently generated estimated bias current from 712 into the bias table as the bias current entry for the zone. The method 700 then starts a movement of the actuator assembly 118 in a seek mode in 722. If the condition is high, or 1, to indicate that the preceding seek was too short, then the method 700 proceeds directly to 722 to start a movement of the actuator assembly 118 without changing the bias table.

The method 700 determines, in 724, if the length of the present seek is less than a seek length boundary. If so, the condition is set high in 726. If the length of the present seek is not less than the seek length boundary the method 700 sets the condition low in 728. Following either 726 or 728, the method 700 applies a bias current to the voice coil 140 in 730. The bias current is calculated based on the length of the present seek as is described below with reference to FIG. 8. The bias current is applied to the voice coil 140 and is updated as the transducer 128 moves through different zones until it settles over the target track in 732. The method 700 then positions the transducer 128 over the target track, which becomes the present track, in the track-and-follow mode in 710.

The seek length boundary is chosen by testing the disc drive 100. The transducer 128 is moved repeatedly in a seek mode over different distances, and the bias table is updated after each movement. A comparison of the updated bias table with an original bias table indicates longer seek lengths for which the nonlinear friction in the pivot 190 does not result in high bias current entries in the bias table. The seek length boundary is selected to separate the longer seek lengths from shorter seek lengths which result in high bias current entries.

Figure 8:
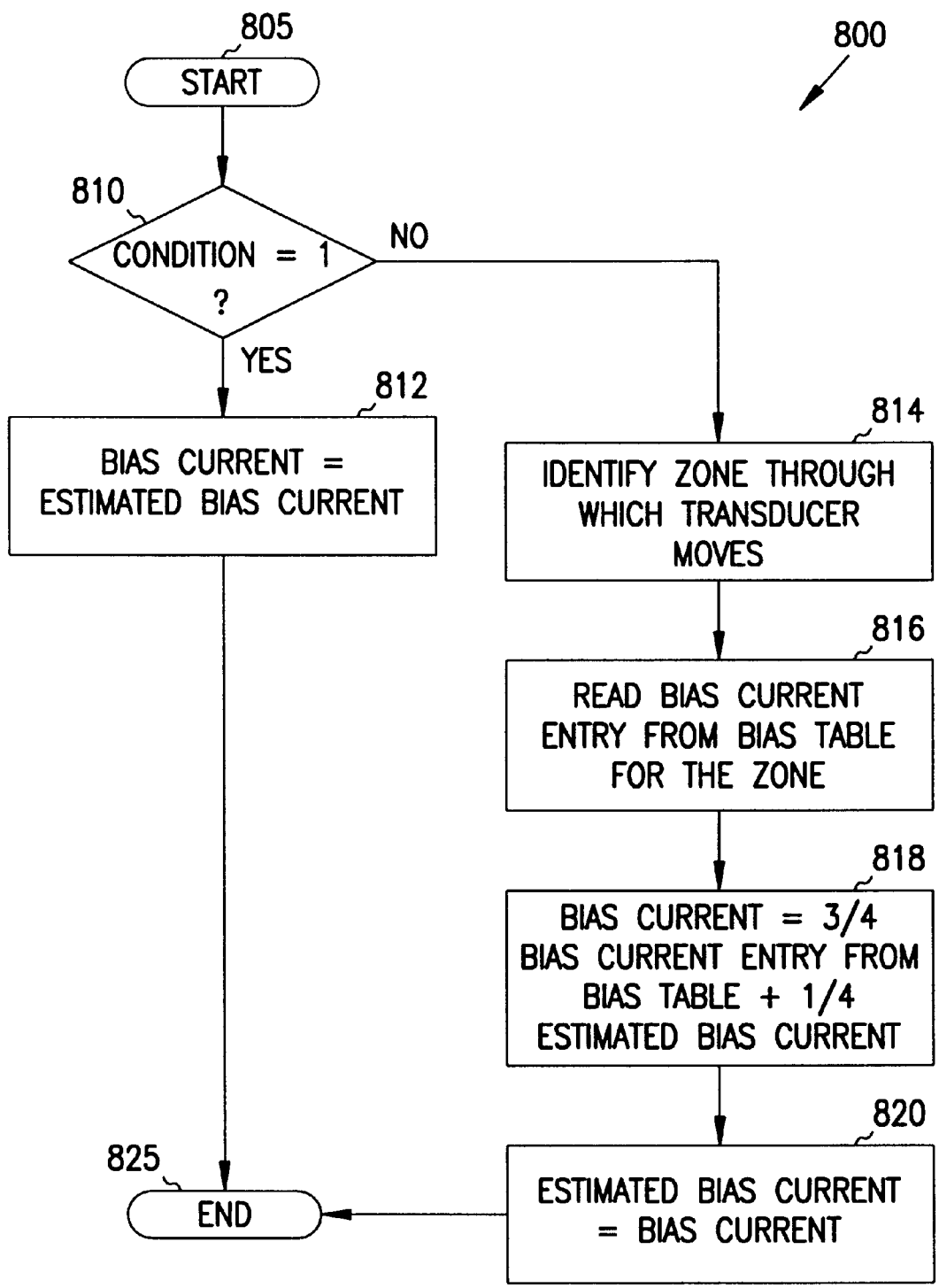
FIG. 8 is a flowchart of a method for calculating a bias current applied in the method of FIG. 7 according to an embodiment of the present invention.

A flowchart of a method 800 for calculating the bias current applied in 730 is shown in FIG. 8 according to an embodiment of the present invention. The bias current is selected based on whether the present seek is sufficiently long or too short as determined in 724 of the method 700. The method 800 begins in 805, and determines the state of the condition in 810. If the present seek is less than the seek length boundary and the condition is high, then the most recently generated estimated bias current from 712 of the method 700 is applied to the voice coil 140 as the bias current in 812. As described above, if a series of short seeks occur friction in the pivot 190 accumulates to cause the bias on the actuator assembly 118 to rise. Increasingly larger bias currents are necessary to counter the rising bias. Therefore, the most recently generated estimated bias current from the most recent track-and-follow mode is probably closest to the bias current necessary to balance the bias on the actuator assembly 118 during a short seek.

If the present seek is not less than the seek length boundary and the condition is low then the bias current is substantially determined from the bias table. The method 800 identifies a zone in the bias table through which the transducer 128 moves in 814, and the bias current entry for the zone is read in 816. In 818, the bias current is calculated as ¾ of the bias current entry read from the bias table plus ¼ of the most recently generated estimated bias current from 712 in the method 700, and this bias current is applied to the voice coil 140. The estimated bias current is then updated in 820 to be equal to the bias current calculated in 818. Therefore, in a long seek the bias current is substantially equal to the bias current entries in the bias table, but ¼ of the bias current is attributed to the most recently generated estimated bias current because the friction in the pivot 190 does not change suddenly but gradually as the speed of the actuator assembly 118 increases. The estimated bias current is updated in 820 to be closer to the bias current entries in the bias table each time the method 800 is executed as the influence of the friction in the pivot 190 immediately preceding the seek is reduced. The method 800 ends in 825. The method 800 is executed repeatedly until the transducer 128 settles over the target track in 732 of the method 700.

Figure 9:
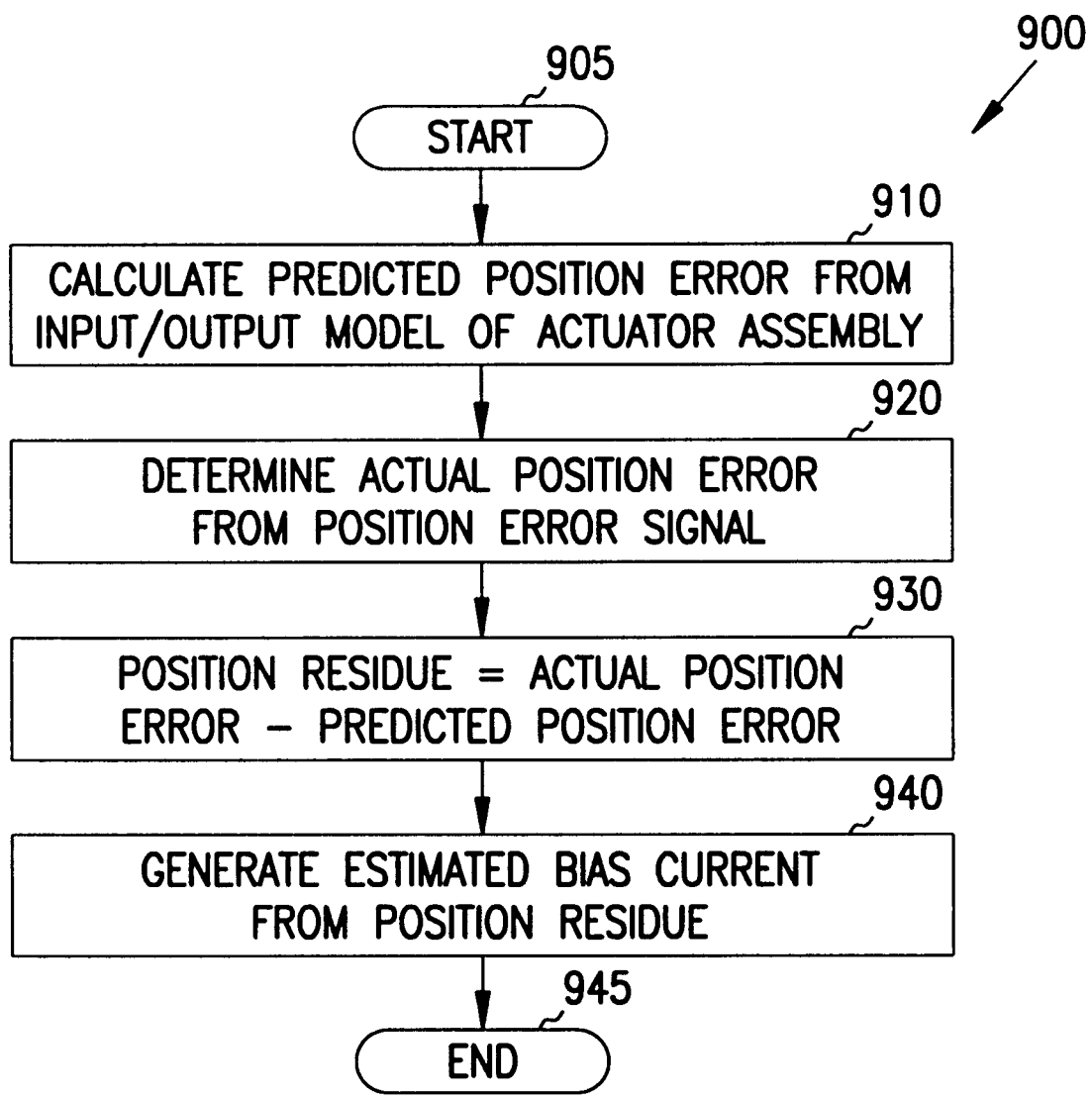
FIG. 9 is a flowchart of a bias estimator according to an embodiment of the present invention.

A flowchart of a bias estimator 900 that is used to generate the estimated bias current in 712 of the method 700 is shown in FIG. 9 according to an embodiment of the present invention. The method 900 begins in 905, and a predicted position error for the transducer 128 is calculated from an input/output model of the actuator assembly 118 in 910. An actual position error for the transducer 128 is determined from the position error signal produced by the feedback control system in 920. A position residue is calculated in 930 as a difference between the actual position error and the predicted position error, and the estimated bias current is generated from the position residue in 940. The method 900 ends at 945.

The methods 700–900 according to embodiments of the present invention control the movement of the actuator assembly 118 such that the bias table is not corrupted by abnormally large estimated bias currents after short seeks because the bias table is not changed after such short seeks. Also, during a short seek the estimated bias current is applied to the voice coil 140 to better balance the bias caused by accumulating friction in the pivot 190. The bias current entries in the bias table are not calculated to compensate for the accumulating friction, and are therefore not used in a short seek. In a sufficiently long seek, where accumulated friction in the pivot 190 is gradually reduced to be substantially insignificant, the bias current entries in the bias table substantially determine the bias current. Therefore, the methods 700–900 accommodate nonlinear friction in the pivot 190 and preserve accurate bias current entries in the bias table to reduce the seek error rate.

Figure 10:
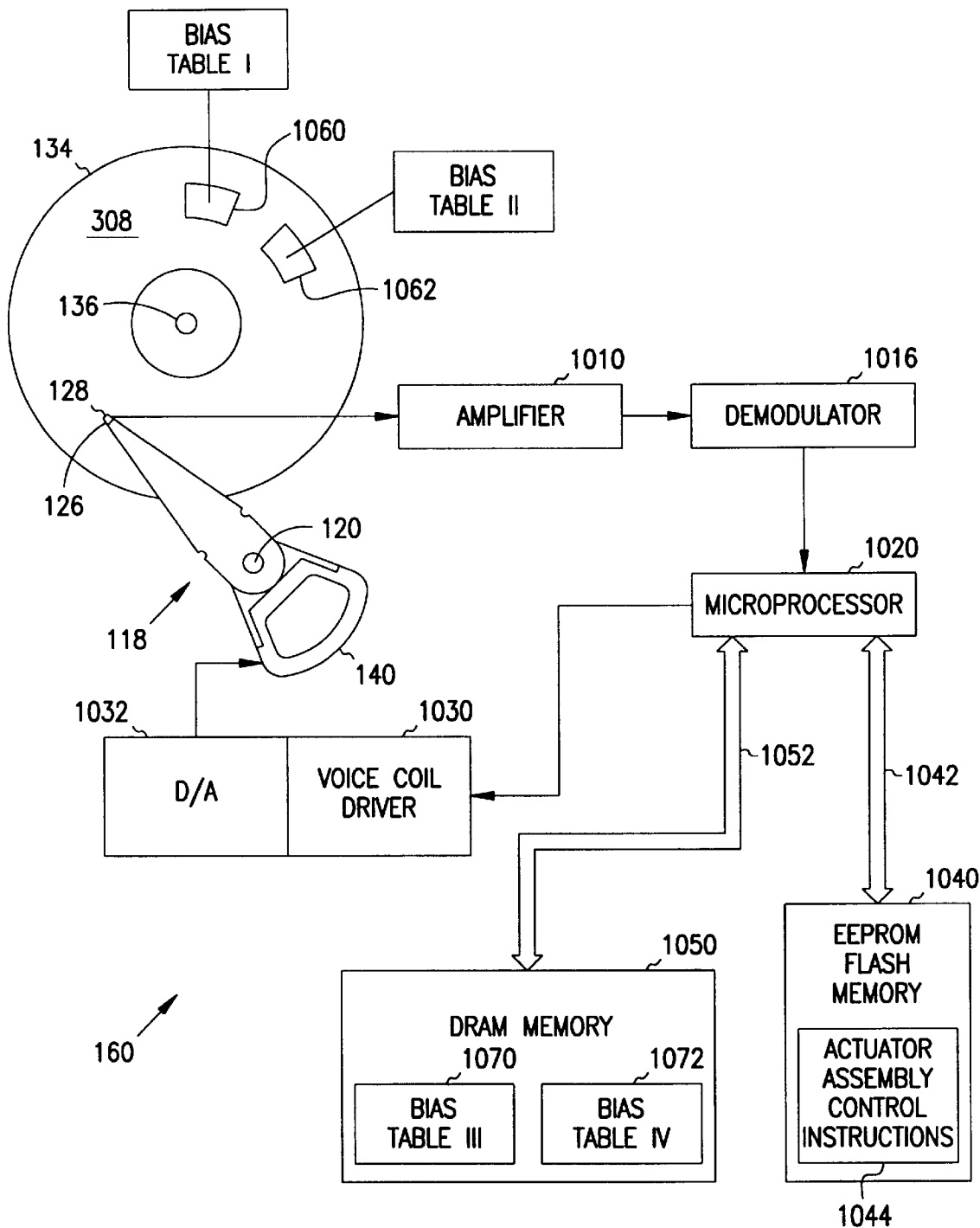
FIG. 10 is a block diagram of a disc drive according to an embodiment of the present invention.
Figure 11:
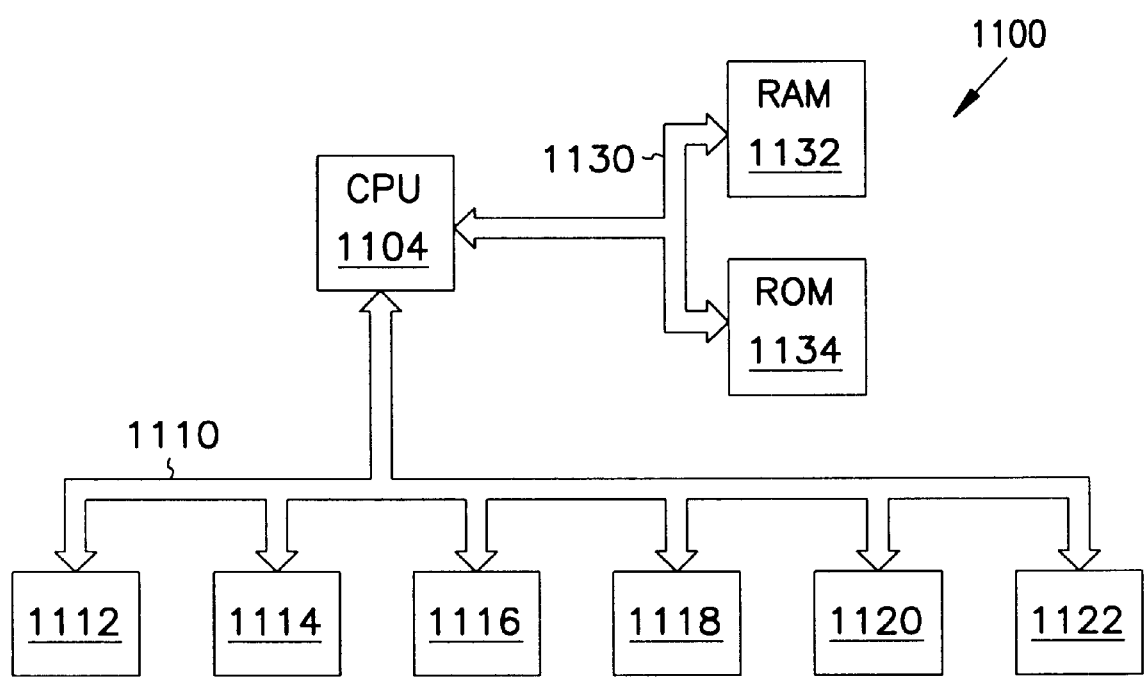
FIG. 11 is a block diagram of an information handling system according to an embodiment of the present invention.

A block diagram of the actuator assembly 118, the discs 134, and the circuits 160 of the disc drive 100 is shown in FIG. 10 according to an embodiment of the present invention. The surface 308 of the disc 134 shown in FIG. 3 is also shown in FIG. 10 without the tracks 310–320 or the servo wedges 330 for purposes of clarity. The position of one of the transducers 128 over the surface 308 is controlled by a feedback control system in the circuits 160. Those skilled in the art with the benefit of the present description will understand that the circuits control the position of all the transducers 128 relative to all of the discs 134.

The feedback control system includes an amplifier 1010 to amplify a signal generated by the transducer 128 as it is reading information from the surface 308. The signal amplified by the amplifier 1010 is demodulated by a demodulator 1016 and provided to a microprocessor 1020 that controls most operations of the disc drive 100. The microprocessor 1020 generates a control signal to control a movement of the actuator assembly 118. The control signal is coupled to a voice coil driver 1030 which generates a driver signal that is converted by a digital-to-analog (D/A) converter circuit 1032 into an analog driver signal that is applied to the voice coil 140.

The microprocessor 1020 processes a servo interrupt each time the transducer 128 passes over one of the servo wedges 330 in the surface 308. The transducer 128 reads the servo information in the wedge and transmits it to the microprocessor 1020. The servo information indicates the location of the transducer 128 by track number and sector number. The track number indicates the track over which the transducer 128 is located in the methods 700, 800, and 900 described above according to embodiments of the present invention. The tracking information in the servo wedge 330 indicates the position of the transducer 128 relative to one of the tracks, and the microprocessor 1020 generates a position error signal from the tracking information indicating an error in the position of the transducer 128 relative to the track. The position error signal is used to correct the position of the transducer 128 in the track-and-follow mode, and the control signal is generated based in part on the position error signal.

The microprocessor 1020 is coupled to exchange information with an EEPROM flash memory device 1040 through a bus 1042. The flash memory device 1040 is a computer-readable medium that stores computer-readable and computer-executable instructions or data. The computer-readable and computer-executable instructions include actuator assembly control instructions 1044 in the form of assembly code to implement the methods 700, 800, and 900 described above. The microprocessor 1020 retrieves and executes the instructions 1044 to control the actuator assembly 118 according to embodiments of the present invention. The microprocessor 1020 is also coupled to exchange information with a DRAM memory device 1050 through a bus 1052. The DRAM memory device 1050 is a computer-readable medium that comprises computer-readable and computer-executable instructions or data.

The bias table described above with reference to the methods 700, 800, and 900 is implemented with four bias tables as will now be described. Two original bias tables, bias table I, 1060 and bias table II, 1062, are built during a calibration of the disc drive 100 during its manufacture. Bias table I, 1060 contains bias current entries to be applied when the transducer 128 is moving toward the hub 136, and bias table II, 1062 contains bias current entries to be applied when the transducer 128 is moving away from the hub 136. The calibration is carried out by operating the disc drive 100 to control movements of the actuator assembly 118, and to generate estimated bias currents to be entered into the bias tables 1060, 1062. The bias tables 1060, 1062 are written to and stored on the surface 308 of the disc 134, and are not usually changed during the operating life of the disc drive 100.

Each time the disc drive 100 receives power and begins to operate, bias current entries from bias table I, 1060, are stored in the DRAM memory device 1050 as a new bias table III, 1070, and bias current entries from bias table II, 1062, are stored in the DRAM memory device 1050 as a new bias table IV, 1072. Bias table III, 1070 contains bias current entries to be applied when the transducer 128 is moving toward the hub 136, and Bias table IV, 1072 contains bias current entries to be applied when the transducer 128 is moving away from the hub 136. The bias current entries in the bias tables 1070, 1072 in the DRAM memory device 1050 are read and modified during the operation of the disc drive 100 as according to the methods 700, 800, and 900. When the disc drive 100 is shut down and loses power, the bias tables 1070, 1072 in the DRAM memory device 1050 are lost. The bias tables 1070, 1072 are restarted with the bias current entries in the bias tables 1060, 1062 the next time the disc drive 100 begins to operate.

A block diagram of an information handling system 1100 is shown in Figure according to an embodiment of the present invention. The information handling system 1100 may also be called an electronic system or a computer system. The information handling system 1100 includes a central processing unit (CPU) 1104 coupled to exchange information through a bus 1110 with several peripheral devices 1112, 1114, 1116, 1118, 1120, and 1122. The peripheral devices 1112–1122 include the disc drive 100 implementing the methods 700, 800, and 900 according to embodiments of the present invention, and may also include a magneto optical drive, a floppy disc drive, a monitor, a keyboard, and other such peripherals. The CPU 1104 is also coupled to exchange information through a bus 1130 with a random access memory (RAM) 1132 and a read-only memory (ROM) 1134.

Those skilled in the art having the benefit of this description can appreciate that the present invention may be practiced with any variety of system. Such systems may include, for example, a video game, a hand-held calculator, a personal computer, a server, a workstation, a routing switch, or a multi-processor computer system, or an information appliance such as, for example, a cellular telephone or any wireless device, a pager, or a daily planner or organizer, or an information component such as, for example, a telecommunications modem, or other appliance such as, for example, a hearing aid, a washing machine, or a microwave oven.

Conclusion

In conclusion, a method of operating a disc drive 100 is disclosed. The method includes controlling a position of a transducer 128 over a present track on a disc 134 in a track-and-follow mode 442, the transducer 128 being supported by an actuator assembly 118 that is accelerated by controlling current in a voice coil 140 in the actuator assembly 118. The method also includes generating an estimated bias current to be applied to the voice coil 140 to balance a bias on the actuator assembly 118 when the transducer 128 is over the present track, starting a movement of the transducer 128 toward a target track in a seek mode 434, entering the estimated bias current into a bias table 1070, 1072 if an immediately preceding movement of the transducer 128 in the seek mode 434 was longer than a seek length boundary, and applying a bias current to the voice coil 140 calculated based on a bias current entry in the bias table 1070, 1072 during the seek mode 434. The estimated bias current is generated by calculating a predicted position error for the transducer 128 from an input/output model of the actuator assembly 118, determining an actual position error of the transducer 128 from a feedback control system 160 controlling the position of the transducer 128, calculating a position residue as a difference between the actual position error and the predicted position error, and generating an estimated bias current from the position residue. The method further includes applying a first current to the voice coil 140 in the seek mode 434 to accelerate the actuator assembly 118, applying a second current to the voice coil 140 in the seek mode 434 to maintain a predetermined velocity of the actuator assembly 118, applying a third current to the voice coil 140 in the seek mode 434 to decelerate the actuator assembly 118 when the transducer 128 is near the target track, applying a fourth current to the voice coil 140 to allow the transducer 128 to settle over the target track, and applying a fifth current to the voice coil 140 in the track-and-follow mode 442 to position the transducer 128 over the target track. Applying a bias current includes determining a length of movement of the transducer 128 between the present track and the target track in the seek mode 434, calculating a bias current to be equal to the estimated bias current if the length of movement is less than the seek length boundary, and if the length of movement is greater than or equal to the seek length boundary, then calculating the bias current by identifying a zone of the disc 134 through which the transducer 128 moves, reading a bias current entry in the bias table 1070, 1072 for the zone through which the transducer 128 moves, calculating the bias current to be equal to ¼ of the estimated bias current plus ¾ of the bias current entry, and setting the estimated bias current to be equal to the bias current. Finally, the bias current is applied to the voice coil 140 during the seek mode 434. Controlling the position of the transducer includes reading tracking information from a servo wedge 330 on the disc 134, generating a position error signal for the transducer 128 from the tracking information, generating a control signal based on the position error signal, generating a driver signal based on the control signal, and applying the driver signal to the voice coil 140 to control the position of the transducer 128. Entering the estimated bias current includes entering the estimated bias current into a first bias table 1070 if the immediately preceding movement of the transducer 128 in the seek mode 434 was toward a hub 136 to which the disc 134 is mounted, and entering the estimated bias current into a second bias table 1072 if the immediately preceding movement of the transducer 128 in the seek mode 434 was away from the hub 136. The method further includes generating the seek length boundary to indicate seek lengths shorter than the seek length boundary for which nonlinear friction in a pivot in the actuator assembly 118 is more substantial and seek lengths equal to or longer than the seek length boundary for which nonlinear friction in the pivot is less substantial.

A disc drive system 100 is also disclosed. The disc drive system 100 includes a disc 134, a transducer 128 supported by an actuator assembly 118 that is accelerated by controlling current in a voice coil 140 in the actuator assembly 118, and a control circuit 160. The control circuit 160 is operatively configured to control a position of the transducer 128 over a present track on the disc 134 in a track-and-follow mode 442, generate an estimated bias current to be applied to the voice coil 140 to balance a bias on the actuator assembly 118 when the transducer 128 is over the present track, start a movement of the transducer 128 toward a target track in a seek mode 434, enter the estimated bias current into a bias table 1070, 1072 if an immediately preceding movement of the transducer 128 in the seek mode 434 was longer than a seek length boundary, and apply a bias current to the voice coil 140 calculated based on a bias current entry in the bias table 1070, 1072 during the seek mode 434. The estimated bias current is generated by calculating a predicted position error for the transducer 128 from an input/output model of the actuator assembly 118, determining an actual position error of the transducer 128 from a feedback control system 160 controlling the position of the transducer 128, calculating a position residue as a difference between the actual position error and the predicted position error, and generating an estimated bias current from the position residue. The control circuit 160 is further operatively configured to apply a first current to the voice coil 140 in the seek mode 434 to accelerate the actuator assembly 118, apply a second current to the voice coil 140 in the seek mode 434 to maintain a predetermined velocity of the actuator assembly 118, apply a third current to the voice coil 140 in the seek mode 434 to decelerate the actuator assembly 118 when the transducer 128 is near the target track, apply a fourth current to the voice coil 140 to allow the transducer 128 to settle over the target track, and apply a fifth current to the voice coil 140 in the track-and-follow mode 442 to position the transducer 128 over the target track. The bias current is applied to the voice coil 140 by determining a length of movement of the transducer 128 between the present track and the target track in the seek mode 434, calculating a bias current to be equal to the estimated bias current if the length of movement is less than the seek length boundary, and if the length of movement is greater than or equal to the seek length boundary, then calculating the bias current by identifying a zone of the disc 134 through which the transducer 128 moves, reading a bias current entry in the bias table 1070, 1072 for the zone through which the transducer 128 moves, calculating the bias current to be equal to ¼ of the estimated bias current plus ¾ of the bias current entry, and (e)(iii)(d) setting the estimated bias current to be equal to the bias current. Finally, the bias current is applied to the voice coil 140 during the seek mode 434. Controlling the position of the transducer 128 includes reading tracking information from a servo wedge 330 on the disc 134, generating a position error signal for the transducer 128 from the tracking information, generating a control signal based on the position error signal, generating a driver signal based on the control signal, and applying the driver signal to the voice coil 140 to control the position of the transducer 128. Entering the estimated bias current includes entering the estimated bias current into a first bias table 1070 if the immediately preceding movement of the transducer 128 in the seek mode 434 was toward a hub 136 to which the disc 134 is mounted, and entering the estimated bias current into a second bias table 1072 if the immediately preceding movement of the transducer 128 in the seek mode 434 was away from the hub 136. The control circuit 160 includes a microprocessor 1020 coupled to receive a signal from the transducer 128 through an amplifier 1010 and a demodulator 1016, and to generate a control signal to control a movement of the actuator assembly 118 through a voice coil driver 1030 and a digital-to-analog converter 1032 to convert the control signal to a driver signal to be applied to the voice coil 140. The control circuit 160 also includes a first memory device 1040 coupled to the microprocessor 1020 to store instructions to be executed by the microprocessor 1020 to control the position of the transducer 128, and a second memory device 1050 coupled to the microprocessor 1020 to store the bias table 1070, 1072 including bias current entries for a respective plurality of zones of the disc 134. An information handling system 1100 of the type including the disc drive system 100 includes a bus 1110 operatively coupled to the disc drive system 100, a central processing unit 1104 operatively coupled to the bus 1110, and a plurality of peripheral devices 1112–1122 operatively coupled to the bus 1110.

Also disclosed is a disc drive system 100 including a disc 134, a transducer 128 supported by an actuator assembly 118 over the disc 134, and means for controlling a movement of the actuator assembly 118 and the transducer 128 over the disc 134.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of operating a disc drive comprising steps of:
   (a) controlling a position of a transducer over a present track on a disc in a track-and-follow mode, the transducer being supported by an actuator assembly that is accelerated by controlling current in a voice coil in the actuator assembly;
   (b) generating an estimated bias current to be applied to the voice coil to balance a bias on the actuator assembly when the transducer is over the present track;
   (c) starting a movement of the transducer toward a target track in a seek mode;
   (d) entering the estimated bias current into a bias table if an immediately preceding movement of the transducer in the seek mode was longer than a seek length boundary; and
   (e) applying a bias current to the voice coil calculated based on a bias current entry in the bias table during the seek mode.

2. The method of claim 1 wherein generating step (b) comprises steps of:
   (b)(i) calculating a predicted position error for the transducer from an input/output model of the actuator assembly;
   (b)(ii) determining an actual position error of the transducer from a feedback control system controlling the position of the transducer;
   (b)(iii) calculating a position residue as a difference between the actual position error and the predicted position error; and
   (b)(iv) generating an estimated bias current from the position residue.

3. The method of claim 1, further comprising steps of:
(f) applying a first current to the voice coil in the seek mode to accelerate the actuator assembly;
(g) applying a second current to the voice coil in the seek mode to maintain a predetermined velocity of the actuator assembly;
(h) applying a third current to the voice coil in the seek mode to decelerate the actuator assembly when the transducer is near the target track;
(j) applying a fourth current to the voice coil to allow the transducer to settle over the target track; and
(k) applying a fifth current to the voice coil in the track-and-follow mode to position the transducer over the target track.

4. The method of claim 1 wherein applying step (e) comprises steps of:
(e)(i) determining a length of movement of the transducer between the present track and the target track in the seek anode;
(e)(ii) calculating a bias current to be equal to the estimated bias current if the length of movement is less tan the seek length boundary;
(e)(iii) if the length of movement is greater than or equal to the seek length boundary, then calculating the bias current comprising steps of:
(e)(iii)(a) identifying a zone of the disc through which the transducer moves;
(e)(iii)(b) reading a bias current entry in the bias table for the zone through which the transducer moves;
(e)(iii)(c) calculating the bias current to be equal to ¼ of the estimated bias current plus ¾ of the bias current entry; and
(c)(iii)(d) setting the estimated bias current to be equal to the bias current; and
(e)(iv) applying the bias current to the voice coil during the seek mode.

5. The method of claim 1 wherein controlling step (a) comprises steps of:
(a)(i) reading tracking information from a servo wedge on the disc;
(a)(ii) generating a position error signal for the transducer from the tracking information;
(a)(iii) generating a control signal based on the position error signal;
(a)(iv) generating a driver signal based on the control signal; and
(a)(v) applying the driver signal to the voice coil to control the position of the transducer.

6. The method of claim 1 wherein entering step (d) further comprises steps of:
(d)(i) entering the estimated bias current into a first bias table if the immediately preceding movement of the transducer in the seek mode was toward a hub to which the disc is mounted; and
(d)(ii) entering the estimated bias current into a second bias table if the immediately preceding movement of the transducer in the seek mode was away from the hub.

7. The method of claim 1, further comprising step of generating he seek length boundary to indicate seek lengths shorter than the seek length boundary for which nonlinear friction in a pivot in the actuator assembly is more substantial and seek lengths equal to or longer than the seek length boundary for which nonlinear friction in the pivot is less substantial.

8. A disc drive system comprising:
a disc;
a transducer shorted by an actuator assembly that is accelerated by controlling current in a voice coil in the actuator assembly; and
a control circuit operatively configured to:
(a) control a position of the transducer over a present track on the disc in a track-and-follow mode;
(b) generate an estimated bias current to be applied to the voice coil to balance a bias on the actuator assembly when the transducer is over the present track;
(c) start a movement of the transducer toward a target track in a seek mode;
(d) enter the estimated bias current into a bias table if an immediately preceding movement of the transducer in the seek mode was longer than a seek length boundary; and
(e) apply a bias current to the voice coil calculated based on a bias current entry in the bias table during the seek mode.

9. The disc drive system of claim 8 wherein generating step (b) comprises steps of:
(b)(i) calculating a predicted position error for the transducer from an input/output model of the actuator assembly;
(b)(ii) determining an actual position error of the transducer from a feedback control system controlling the position of the transducer;
(b)(iii) calculating a position residue as a difference between the actual position error and the predicted position error; and
(b)(iv) generating an estimated bias current from the position residue.

10. The disc drive system of claim 8 wherein the control circuit is further operatively configured to:
(f) applying a first current to the voice coil in the seek mode to accelerate the actuator assembly;
(g) applying a second current to the voice coil in the seek mode to maintain a predetermined velocity of the actuator assembly;
(h) applying a third current to the voice coil in the seek mode to decelerate the actuator assembly when the transducer is near the target track;
(j) applying a fourth current to the voice coil to allow the transducer to settle over the target track; and
(k) applying a fifth current to the voice coil in the track-and-follow mode to position the transducer over the target track.

11. The disc drive system of claim 8 wherein applying step (e) comprises steps of:
(e)(i) determining a length of movement of the transducer between the present track and the target track in the seek mode;
(e)(ii) calculating a bias current to be equal to the estimated bias current if the length of movement is less than the seek length boundary,
(e)(iii) if the length of movement is greater than or equal to the seek length boundary; then calculating the bias current comprising steps of:
(e)(iii)(a) identifying a zone of the disc through which the transducer moves;
(e)(iii)(b) reading a bias current entry in the bias table for the zone through which the transducer moves;

(e)(iii)(c) calculating the bias current to be equal to ¼ of the estimated bias current plus ¾ of the bias current entry; and (e)(iii)(d) setting the estimated bias current to be equal to the bias current; and (e)(iv) applying the bias current to the voice coil during the seek mode.

12. The disc drive system of claim 8 wherein controlling step (a) comprises steps of:

(a)(i) reading tracking information from a servo wedge on the disc;

(a)(ii) generating a position error signal for the transducer from the tracking information;

(a)(iii) generating a control signal based on the position error signal;

(a)(iv) generating a driver signal based on the control signal; and (a)(v) applying the driver signal to the voice coil to control the position of the transducer.

13. The disc drive system of claim 8 wherein entering step (d) further comprises steps of:

(d)(i) entering the estimated bias current into a first bias table if the immediately preceding movement of the transducer in the seek mode was toward a hub to which the disc is mounted; and (d)(ii) entering the estimated bias current into a second bias table if the immediately preceding movement of the transducer in the seek mode was away from the hub.

14. The disc drive system of claim 8 wherein the control circuit comprises:

a microprocessor coupled to receive a signal from the transducer through an amplifier and a demodulator, and to generate a control signal to control a movement of the actuator assembly through a voice coil driver and a digital-to-analog converter to convert the control signal to a driver signal to be applied to the voice coil;

a first memory device coupled to the microprocessor to store instructions to be executed by the microprocessor to control the position of the transducer; and a second memory device coupled to the microprocessor to store the bias table including bias current entries for a respective plurality of zones of the disc.

15. An information handling system of the type including the disc drive system of claim 8, and further comprising:

a bus operatively coupled to the disc drive system;

a central processing unit operatively coupled to the bus;

a data storage device operatively coupled to the bus; and an input/output subsystem operatively coupled to the bus.

16. A method comprising the steps of:

replacing a first estimated bias value with a second estimated bias value if an immediately preceding movement of a moveable arm was longer than a length boundary; and controlling the moveable arm responsive to one of the estimated bias values.

* * * * *